US010557935B2

(12) United States Patent
Pascheka

(10) Patent No.: US 10,557,935 B2
(45) Date of Patent: Feb. 11, 2020

(54) DETERMINING A STATE OF A VEHICLE AND ASSISTING A DRIVER IN DRIVING THE VEHICLE

(71) Applicant: VOLKSWAGEN AG, Wolfsburg (DE)

(72) Inventor: Patrick Pascheka, Braunschweig (DE)

(73) Assignee: Volkswagen AG (DE)

( * ) Notice: Subject to any disclaimer, the term of this patent is extended or adjusted under 35 U.S.C. 154(b) by 400 days.

(21) Appl. No.: 15/318,720

(22) PCT Filed: May 13, 2015

(86) PCT No.: PCT/EP2015/060600
§ 371 (c)(1),
(2) Date: Dec. 14, 2016

(87) PCT Pub. No.: WO2015/193038
PCT Pub. Date: Dec. 23, 2015

(65) Prior Publication Data
US 2017/0131401 A1 May 11, 2017

(30) Foreign Application Priority Data
Jun. 17, 2014 (DE) .......... 10 2014 211 607

(51) Int. Cl.
G01S 13/93 (2006.01)
B60W 30/095 (2012.01)
(Continued)

(52) U.S. Cl.
CPC ......... G01S 13/931 (2013.01); B60W 30/095 (2013.01); B60W 30/18163 (2013.01);
(Continued)

(58) Field of Classification Search
CPC ........ G01S 13/931; G01S 13/58; G01S 13/92; G01S 13/60; G01S 13/91; G01S 13/93;
(Continued)

(56) References Cited

U.S. PATENT DOCUMENTS 6,097,311 A * 8/2000 Iwasaki ............... B60Q 9/008
340/903
2009/0070039 A1 * 3/2009 Beuschel ............... B60T 7/22
701/301
(Continued)

FOREIGN PATENT DOCUMENTS

DE 102004018681 A1 11/2005
DE 102005039701 A1 3/2007
(Continued)

OTHER PUBLICATIONS

Search Report for German Patent Application No. 10 2014 211 607.4, dated Feb. 27, 2015.
(Continued)

Primary Examiner — Peter M Bythrow
(74) Attorney, Agent, or Firm — Barnes & Thornburg LLP

(57) ABSTRACT

A state of a vehicle, including a sensor for sensing another vehicle, is defined by determining a speed of the vehicle and determining the state in accordance with the sensing range of the sensor and the speed.

15 Claims, 6 Drawing Sheets

(51) Int. Cl.
*B60W 30/18* (2012.01)
*G08G 1/16* (2006.01)
*G01S 13/58* (2006.01)
*G01S 13/60* (2006.01)
*G01S 13/931* (2020.01)

(52) U.S. Cl.
CPC .............. *G01S 13/58* (2013.01); *G01S 13/60* (2013.01); *G08G 1/167* (2013.01); *B60W 2400/00* (2013.01); *B60W 2520/10* (2013.01); *B60W 2550/22* (2013.01); *B60W 2550/30* (2013.01); *G01S 2013/9353* (2013.01); *G01S 2013/9357* (2013.01)

(58) Field of Classification Search
CPC ..... G01S 2013/9353; G01S 2013/9357; G01S 2013/9325; G01S 2013/9375; G01S 2013/9389; B60W 2400/00; B60W 2520/10; B60W 2550/00; B60W 2550/10; B60W 2550/30; B60W 2550/302; B60W 2550/306; B60W 2550/308; G08G 1/16; G08G 1/162; G08G 1/163; G08G 1/166; G08G 1/167
See application file for complete search history.

(56) References Cited

U.S. PATENT DOCUMENTS

| | | | |
|---|---|---|---|
| 2011/0190972 A1* | 8/2011 | Timmons | G01C 21/34 701/31.4 |
| 2013/0194110 A1* | 8/2013 | Kim | G02B 27/01 340/905 |
| 2013/0238189 A1* | 9/2013 | Michaelis | B60R 16/0236 701/36 |
| 2013/0338868 A1 | 12/2013 | Essame et al. | |
| 2014/0139676 A1 | 5/2014 | Wierich | |
| 2014/0277830 A1* | 9/2014 | Kwon | B60W 50/14 701/1 |
| 2014/0309864 A1* | 10/2014 | Ricci | H04W 4/21 701/36 |
| 2015/0039218 A1* | 2/2015 | Bowers | B60W 30/0956 701/301 |
| 2017/0154554 A1* | 6/2017 | Tanaka | B60R 1/00 |

FOREIGN PATENT DOCUMENTS

| | | |
|---|---|---|
| DE | 102008022199 A1 | 6/2009 |
| DE | 102010049091 A1 | 4/2012 |
| DE | 102012103134 A1 | 10/2012 |
| DE | 102011084618 A1 | 4/2013 |
| EP | 2026099 A1 | 2/2009 |

OTHER PUBLICATIONS

Search Report and Written Opinion for International Patent Application No. PCT/EP2015/060600; dated Dec. 14, 2015.

Office Action for Chinese Patent Application No. 201580032649.4; dated Jul. 12, 2019.

* cited by examiner

US 10,557,935 B2

DETERMINING A STATE OF A VEHICLE AND ASSISTING A DRIVER IN DRIVING THE VEHICLE

PRIORITY CLAIM

This patent application is a U.S. National Phase of International Patent Application No. PCT/EP2015/060600, filed 13 May 2015, which claims priority to German Patent Application No. 10 2014 211 607.4, filed 17 Jun. 2014, the disclosures of which are incorporated herein by reference in their entirety.

SUMMARY

Illustrative embodiments relate to a method and an apparatus to determine a state of a vehicle and to assist a driver, in a manner depending on this state, in driving a vehicle.

BRIEF DESCRIPTION OF THE DRAWINGS

In the following, the disclosed embodiments will be described in detail with reference to the figures.

DETAILED DESCRIPTION

Figure 1:
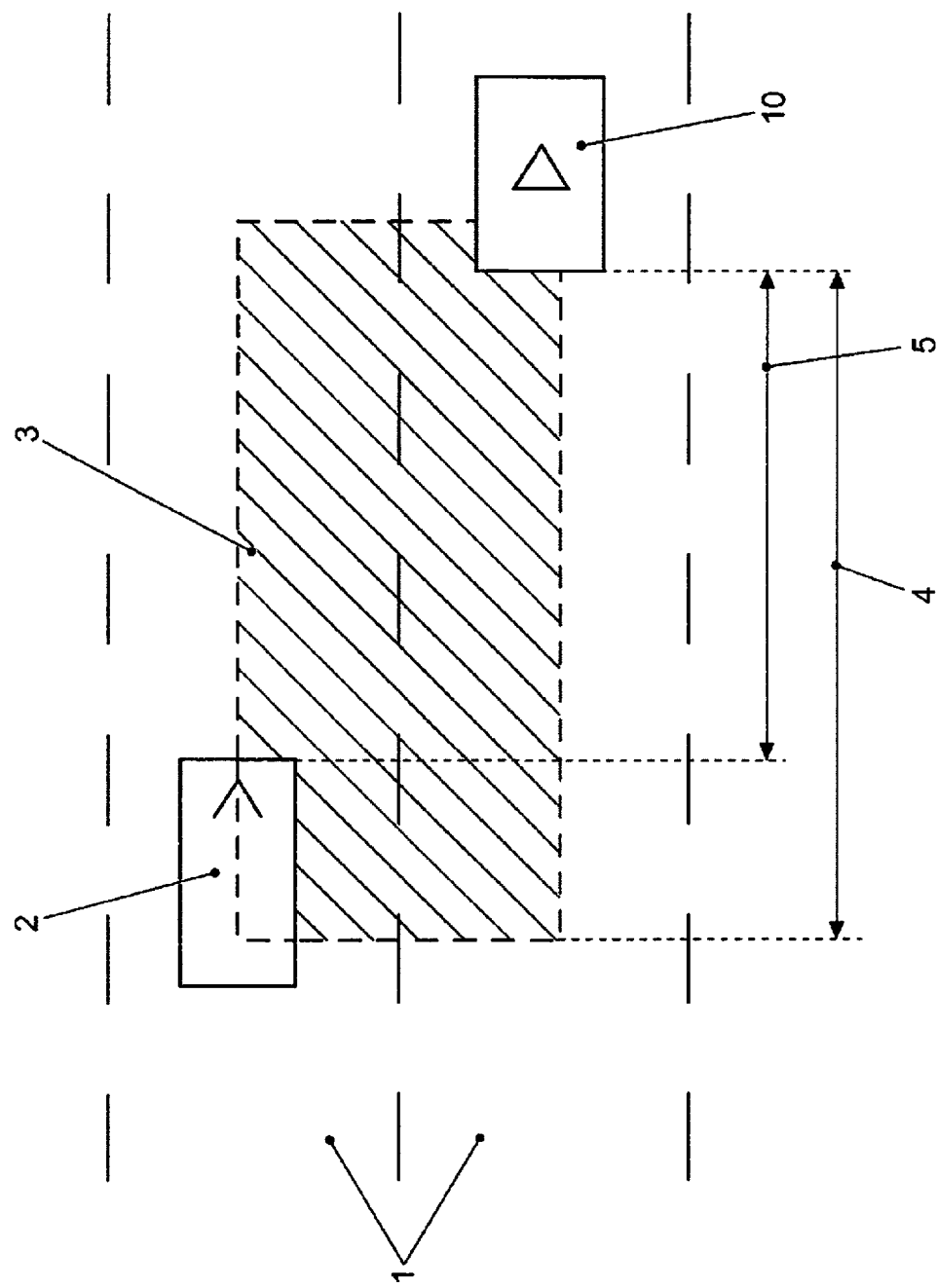
FIG. 1 shows a situation in which another vehicle is following a vehicle within the range of the sensor.

US 2013/0194110 A1 describes a head-up display for displaying further information for the driver of a vehicle.

US 2013/0338868 A1 discloses a lane-change assistant.

Systems and methods to warn, in the course of or prior to a change of lane, about a vehicle traveling in an adjacent lane are known in the prior art. For this purpose, the traffic space in front of and behind the vehicle is monitored, as a rule, with the aid of radar sensor technology. To the extent that vehicles are located within the range of the corresponding sensor technology, the risk, for example, of one's own vehicle colliding—for example, in the course of a change of lane—with one of these vehicles or coming too close to one of these vehicles can be assessed. In other words, the known systems and methods are restricted by the limited range of their sensor technology, since they only warn about vehicles that are located within the range of the sensor technology.

Disclosed embodiments mitigate the previously described problem of the limited range of the sensor technology.

In accordance with the disclosed embodiments, this is achieved by a method for determining a state of a vehicle, by a method for assisting a driver in driving a vehicle, by an apparatus for determining a state of a vehicle, and by a vehicle.

A method is made available for determining a state of a vehicle that includes a sensor for detecting another vehicle. The method comprises the following operations:

determining a current speed of the vehicle.

determining the state of the vehicle as a function of a range of the sensor and on the previously determined current speed of the vehicle.

By the state of the vehicle being determined in a manner depending on the range and on the current speed of the vehicle, the state of the vehicle is determined also when no other vehicle is located within the range of the sensor.

The state of the vehicle may assume the values "critical" and "non-critical". The "critical" state is obtained when a probability of a collision of the vehicle with another vehicle traveling in front of or behind the vehicle (outside the range of the sensor) lies above a predetermined threshold value. The state is deemed to be non-critical if the state is not critical—that is to say, if the probability of the collision of the vehicle with the other vehicle does not lie above the predetermined threshold value.

For example, for the purpose of determining the state, a check can be made as to whether a minimum spacing from the vehicle would be fallen below by another vehicle that, for example, is traveling behind the vehicle just outside the range of the sensor, or whether this other vehicle would, for longer than permissible, come within a speed-dependent minimum spacing from the vehicle. In similar manner, for the purpose of determining the state, a check can be made as to whether the vehicle would fall below a minimum spacing from another vehicle that is traveling in front of the vehicle just outside the range of the sensor, or whether the vehicle would, for longer than permissible, come within a speed-dependent minimum spacing from the other vehicle. If this is the case—that is to say, if the other vehicle would fall below the minimum spacing or would, for longer than permissible, come within the speed-dependent minimum spacing or if the vehicle itself would fall below the minimum spacing or would, for longer than permissible, come within the speed-dependent minimum spacing, the state of the vehicle might be determined as critical.

According to a disclosed embodiment, measured values of the sensor are evaluated. In this disclosed embodiment, the state is determined in a manner depending on the range of the sensor only when, on the basis of the evaluated measured values, no other vehicle is detected that is traveling in the same direction as the vehicle in an adjacent lane on the right or on the left in front of or behind the vehicle.

So if a change of lane into the adjacent right (left) lane is planned, a check is made by means of the sensor as to whether a vehicle is located in the adjacent right (left) lane in front of or behind the vehicle. If no other vehicle in front of the vehicle in the adjacent right (left) lane is detected with the sensor, the state is determined in a manner depending on the range of the sensor. In similar manner, if no other vehicle behind the vehicle in the adjacent right (left) lane is detected with the sensor, the state is determined in a manner depending on the range of the sensor. In this case, the state of the vehicle is considered to be critical when the state was classified as critical in one of the two determinations.

The range may be known to the vehicle, by the range having been stored in the vehicle as a constant. However, it is also possible that the range is determined, for example, in a manner depending on the road on which the vehicle is currently traveling.

The determination of the range offers the benefit that properties of the road or special features of the sensor being employed can beneficially be taken into consideration.

The range is determined as a function of a contour or limit of a detection zone of the sensor, or of a detection zone of several sensors. For this purpose, for each lane of a road being driven along by the vehicle, on which other vehicles are moving in the same direction as the vehicle, a point of intersection in front of the vehicle and a point of intersection behind the vehicle are respectively determined. In this connection, at each point of intersection the center line of the corresponding lane and the contour or limit of the detection zone of the sensor or sensors intersect. The range can then be determined as the spacing between the vehicle and the respective point of intersection. In this disclosed embodiment, the range depends on, amongst other factors, the direction in which the other vehicle is being sought in front of or behind the vehicle.

In this disclosed embodiment, the range is consequently dependent on the roadway or on the course of the roadway, and dependent on whether the range in front of or behind the vehicle is being considered. This disclosed embodiment takes into consideration both the possibly different range of the sensor when monitoring the zone in front of the vehicle and when monitoring the zone behind the vehicle, as well as curves of the road.

In at least one disclosed embodiment, the state of the vehicle is additionally determined in a manner depending on a minimum speed that applies to vehicles that are moving on the road being driven along by the vehicle.

In the case where the minimum speed is taken into consideration, the state of the vehicle can be determined, for example, by a virtual vehicle in front of the vehicle being assumed that is traveling at the minimum speed at a spacing that corresponds to the range of the sensor. Depending on this minimum speed, on the speed of the vehicle, and on the range of the sensor (which may be dependent on the roadway on which the virtual vehicle is being assumed), it can then be calculated whether the vehicle will fall below a predetermined minimum spacing from the other vehicle. The state is then determined as critical if this minimum spacing will be fallen below. For the purpose of calculation, a predetermined (negative) acceleration of the vehicle and a reaction-time of the driver of the vehicle can be assumed. The minimum speed used in the calculation can be calculated on the basis of a product of the applicable minimum speed and a factor (for example, <1), or on the basis of a difference constituted by the applicable minimum speed minus a constant, to have a certain safety threshold on the basis of this factor or this constant. By way of applicable minimum speed, on a highway 80 km/h may be assumed, for example, whereas in urban areas a minimum speed of 0 km/h for the virtual vehicle may also be assumed.

In a further disclosed embodiment, the state of the vehicle is additionally determined in a manner depending on a permissible maximum speed that applies to vehicles that are moving on the road being driven along by the vehicle.

According to this disclosed embodiment, the state of the vehicle can be determined in a manner depending on the permissible maximum speed, on the range of the sensor, and on the current speed of the vehicle. In this case, the maximum speed used in the determination may be set higher—by a predetermined percentage and/or by a predetermined absolute value—than the actually permissible maximum speed, to take instances of the exceeding of the permissible maximum speed appropriately into consideration. Furthermore, the maximum speed being used may also be lane-dependent, to the extent that different maximum speeds exist for different lanes on a highway, for example.

For the purpose of determining the state of the vehicle in a manner depending on the maximum speed, it is assumed that a virtual vehicle that is traveling at the maximum speed is located behind the vehicle at a spacing that corresponds to the range of the sensor. Depending on the maximum speed, on the current speed of the vehicle, and on the range of the sensor in the direction of the virtual vehicle, it can then be calculated whether the virtual vehicle will fall below a predetermined minimum spacing from the vehicle. If this were to be the case, the state of the vehicle will be classified as critical.

For the purpose of determining the state of the vehicle in a manner depending on the maximum speed, it can be assumed, for example, that after a predetermined reaction-time the virtual vehicle exhibits a predetermined (negative) acceleration, and/or that after a predetermined reaction-time the vehicle exhibits a predetermined (positive) acceleration. The progression of the spacing between the virtual vehicle and the vehicle over time can then be determined in a manner depending on the range (the assumed current spacing between the virtual vehicle and the vehicle), on the maximum speed (the assumed speed of the virtual vehicle), on the current speed of the vehicle, on the assumed reaction-time of the driver of the virtual vehicle, and on the assumed negative acceleration of the virtual vehicle after the reaction-time. On the basis of the progression of the spacing over time, the minimum spacing can then be determined. If the minimum spacing lies below a predetermined minimum spacing, the state of the vehicle will be assumed to be critical.

In the embodiments previously described, virtually the worst case is assumed, namely that another vehicle, which is traveling at the maximum speed if it is located behind the vehicle and which is traveling at the minimum speed if it is located in front of the vehicle, is located just outside the range of the sensor. Only if, even assuming this worst case, no undershoot of the minimum spacing between the vehicle and the other vehicle is imminent, is the state of the vehicle classified as non-critical in the case of a planned change of lane, for example.

If another vehicle in front of or behind the vehicle in a lane adjacent to the lane being driven along by the vehicle is detected with the sensor, the state of the vehicle is (also) determined in a manner depending on this other vehicle. For this purpose, the spacing between the vehicle and the other vehicle and a speed of the other vehicle are detected. The state of the vehicle is then determined in a manner depending on the current speed of the vehicle, on the detected speed of the other vehicle, and on the detected spacing.

According to this disclosed embodiment, in a first operation—prior to a change of lane, for example—a check is made as to whether another vehicle in front of the vehicle in a lane to which a change is to be made is being detected with the sensor. If this is the case, the state of the vehicle is determined on the basis of this other vehicle. If this is not the case, the state of the vehicle is determined on the basis of the virtual vehicle traveling (stationary) in front of the vehicle. Equally, prior to the change of lane in a second operation a check is made as to whether another vehicle behind the vehicle in the lane is being detected with the sensor. If this is the case, the state of the vehicle is determined on the basis of this other vehicle. If this is not the case, the state of the vehicle is determined on the basis of the virtual vehicle traveling behind the vehicle. The state of the vehicle is deemed to be non-critical only when the state of the vehicle is classified as non-critical in both operations. Otherwise, the state of the vehicle is determined as critical.

Within the scope of the disclosed embodiments, a method for assisting a driver in driving a vehicle is also made available. In this method, a state of the vehicle is determined with a disclosed embodiment of the method previously described for determining the state of the vehicle. The assistance of the driver then takes place in a manner depending on the determined state of the vehicle.

The method for assisting the driver in driving the vehicle can be employed, for example, in the case of a change of lane of the vehicle. If the state of the vehicle is determined as critical, a warning for the driver can be generated, for example, or the driver can be prevented from carrying out the change of lane.

Within the scope of the disclosed embodiments, an apparatus for determining a state of a vehicle is also made available. This apparatus comprises a sensor, to detect another vehicle in front of or behind the vehicle, and a controller. The controller has been configured, on the one hand, to determine a speed of the vehicle, and, on the other hand, to determine the state in a manner depending on a range of the sensor and on the speed.

The benefits of the disclosed apparatus correspond substantially to the benefits of the disclosed method for determining a state of a vehicle which have previously been set forth in detail, so repetition will be dispensed with here.

Furthermore, the disclosed apparatus may have been configured to implement all the disclosed embodiments, on the one hand of the disclosed method for determining a state of a vehicle, and on the other hand of the disclosed method for assisting a driver in driving a vehicle.

Finally, a disclosed vehicle is made available that includes a disclosed apparatus.

The disclosed embodiments are suitable for motor vehicles. Of course, the disclosed embodiments are not restricted to this field of application, since the disclosed embodiments can also be employed, at least in principle, in ships and aircraft, as well as rail-mounted or track-guided vehicles.

In the situation represented in FIG. 1, a vehicle 10 is traveling in a right-hand lane (traffic lane) 1 of a highway. With the aid of a rearward-oriented sensor (not represented in FIG. 1) another vehicle 2 is detected behind the vehicle 10 in the left-hand lane 1 (viewed from the vehicle 10), which is therefore situated within a detection zone 3 of the sensor. On the basis of results of measurement of the sensor, a spacing 5 between the other vehicle 2 and the vehicle 10 and a speed of the other vehicle 2 can be detected. Depending on the spacing 5, on the speed of the other vehicle 2, and on the current speed of the vehicle 10, the temporal progression of the spacing 5 can then be calculated, for example, taking into consideration a reaction-time of the driver of the other vehicle 2 and a (negative) acceleration of the other vehicle 2 after the reaction-time. On the basis of the temporal progression of the spacing 5, it can be determined whether the minimum of the spacing 5 lies below a minimum spacing or whether a speed-dependent minimum spacing between the vehicle 10 and the other vehicle 2 will be fallen below for longer than prescribed. If this is the case (that is to say, the minimum of the spacing 5 lies below the minimum spacing, or the speed-dependent minimum spacing will be fallen below for longer than prescribed), a state of the vehicle 10 will be classified as critical, so that, for example, the driver of the vehicle 10 would be warned about a change of lane to the left-hand lane 1, or an automatic lane-change assistant of the vehicle 10 would refuse clearance for the change of lane.

Figure 2:
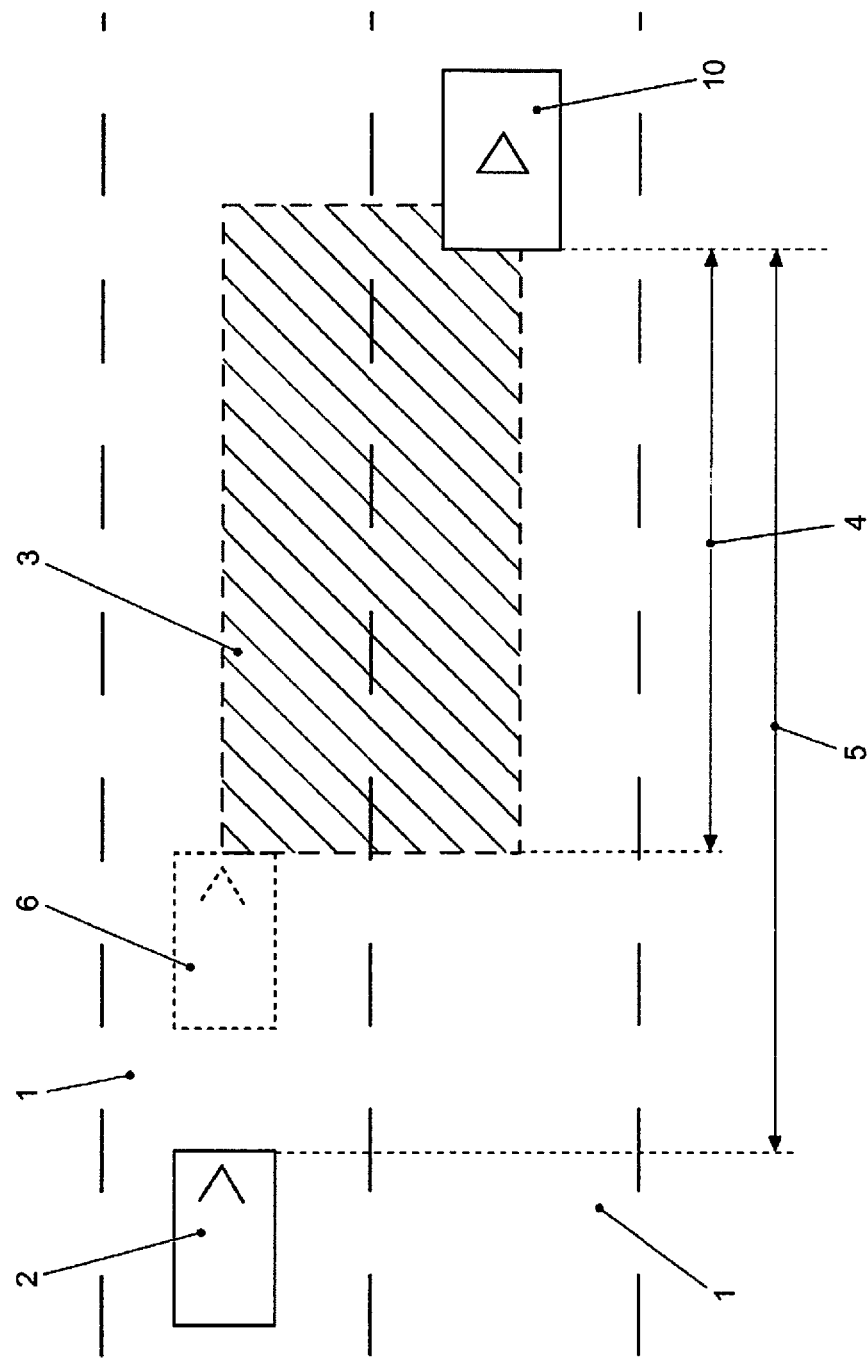
FIG. 2 shows a situation in which no other vehicle is following a vehicle within the range of the sensor.

In contrast to the situation shown in FIG. 1, in the situation represented in FIG. 2 the other vehicle 2 behind the vehicle 10 is located outside the detection zone 3 of the sensor. Therefore the spacing 5 between the vehicle 10 and the other vehicle 2 is greater than the range 4 of the sensor. In this situation, a lane-change assistant according to the state of the art would regard the state as non-critical or would not determine the state of the vehicle.

In accordance with the disclosed embodiments, a virtual vehicle 6 is assumed which is located behind the vehicle 10 at a spacing that corresponds to the range 4 of the sensor. By way of speed of the virtual vehicle 6, the currently permissible maximum speed for that lane in which the virtual vehicle 6 is being assumed is presupposed. In this connection, by way of the speed of the virtual vehicle 6 the permissible maximum speed may be increased by a constant value or may be multiplied by a factor (>1).

On the basis of the virtual vehicle 6, the state of the vehicle 10 is now determined as previously described for the situation represented in FIG. 1. In this case, the virtual vehicle 6 replaces the other vehicle 2, and by way of spacing between the virtual or other vehicle and the vehicle 10 the range of the sensor 4 is assumed. By way of speed of the virtual or other vehicle, the possibly increased maximum speed is presupposed, as previously described.

Normally, the state of the vehicle 10 is determined with a constant, known to the vehicle 10, for the range 4 of the sensor. In accordance with the disclosed embodiments, the range can also be ascertained more precisely, as represented in FIG. 3 and FIG. 4.

Figure 3:
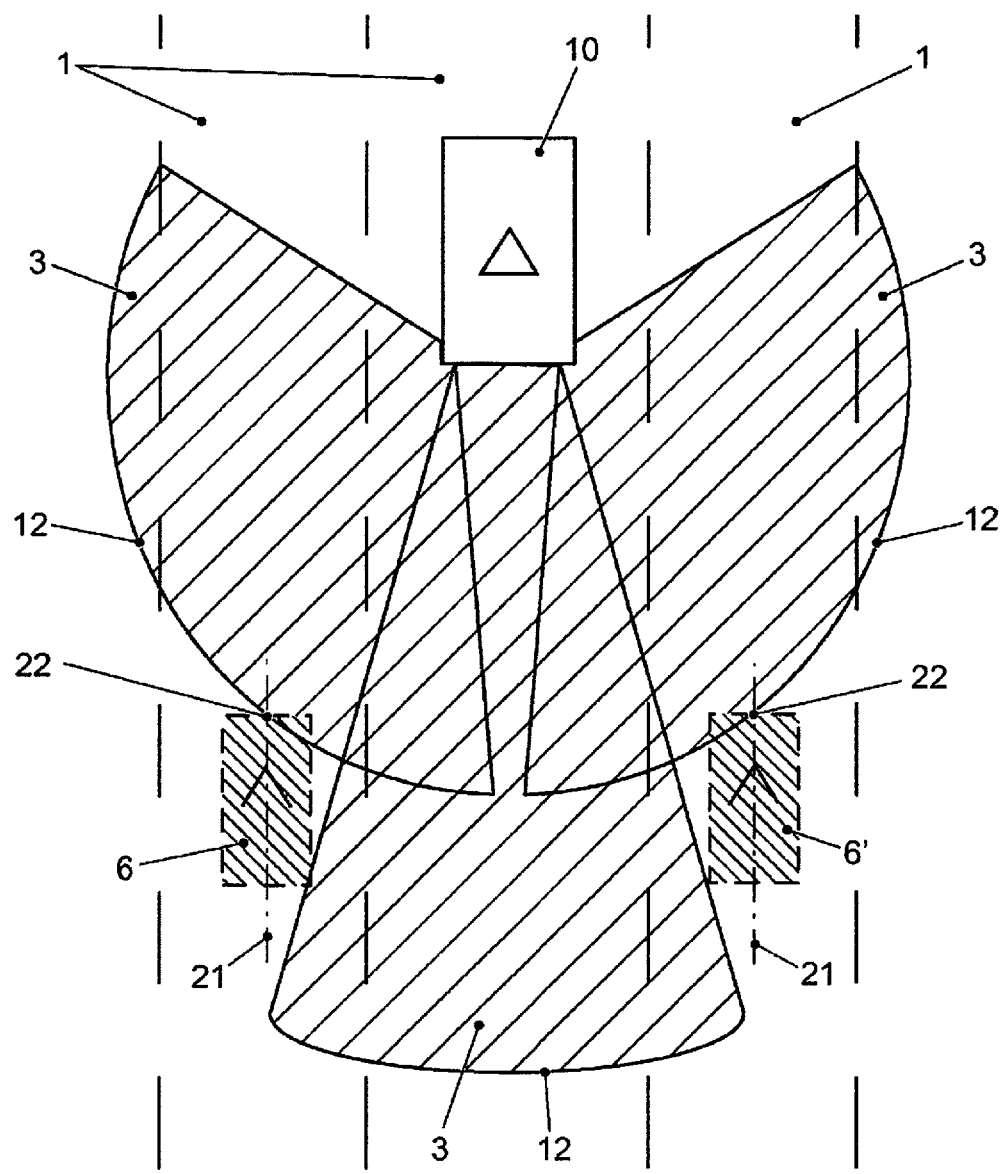
FIG. 3 represents schematically a determination of a range of sensors to a virtual vehicle.

In FIG. 3 it will be discerned that the detection zone 3 of rearward-directed sensor means of the vehicle 10 results from three partly overlapping individual detection zones. For the purpose of determining the range, a point of intersection 22 between a center line 21 of a lane 1, which is adjacent to that lane 1 in which the vehicle 10 is currently traveling, and a contour or limit 12 of the detection zone 3 is now determined. By way of the spacing between the virtual vehicle 6 (left-hand lane) or the virtual vehicle 6' (right-hand lane) and the vehicle 10, the spacing between the vehicle 10 and the respective point of intersection 22 is assumed.

Figure 4:
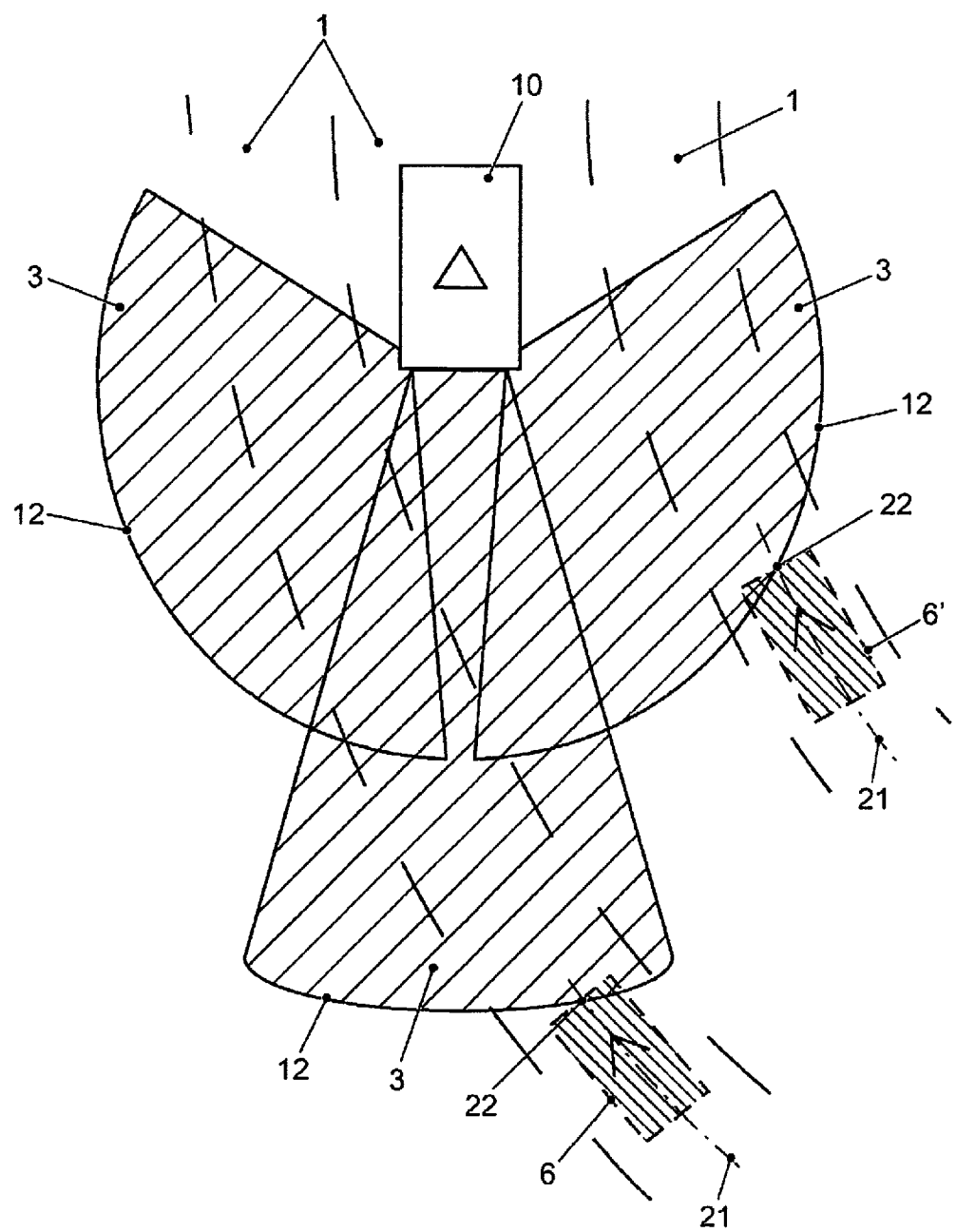
FIG. 4 represents schematically a determination of a range of the sensor to a virtual vehicle in a different situation.

In contrast to FIG. 3, in FIG. 4 a curve portion of a highway is represented. It will be discerned that in this case the spacing between the vehicle 10 and the point of intersection 22 in the right-hand lane is distinctly smaller than the spacing between the vehicle 10 and the point of intersection 22 in the left-hand lane. Therefore the state of the vehicle 10 in the case of a planned change of lane to the right-hand lane would more likely be classified as critical than in the case of a planned change of lane to the left-hand lane.

Figure 5:
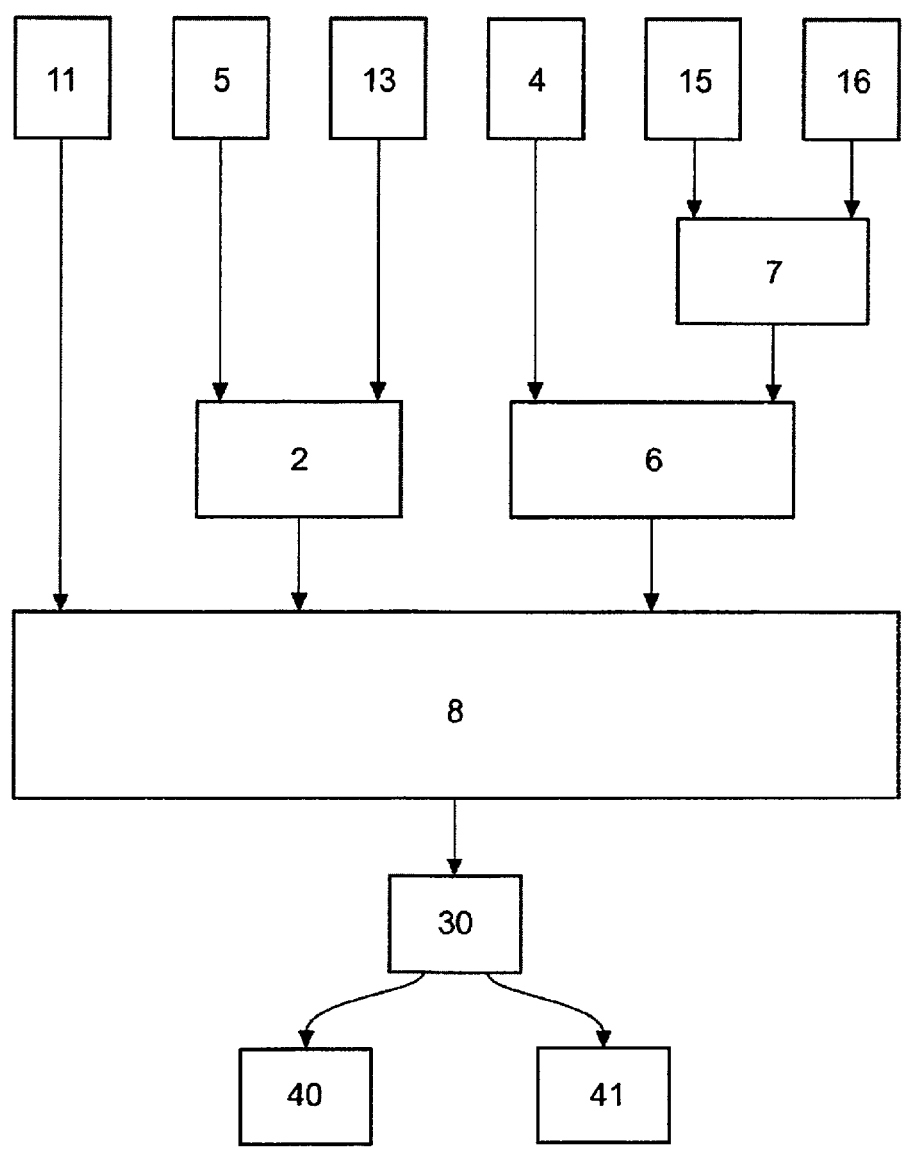
In FIG. 5 shows a block diagram which represents schematically how a state of a vehicle is determined.

In FIG. 5, a block diagram schematically represents how the state of the vehicle is determined.

On the one hand, the current speed 11 of the vehicle 10 is made available by control means 8 of the vehicle 10. If another vehicle 2 behind the vehicle 10 is detected with the sensor, the spacing 5 between the vehicle 10 and the other vehicle 2 and also the speed 13 of the other vehicle 2 are supplied to the control means 8. If, on the other hand, no other vehicle 2 behind the vehicle 10 is detected with the sensor, the sensor range 4 and the speed 7 of a virtual vehicle 6 are made available to the control means 8. In this case, the speed 7 of the virtual vehicle 6 is calculated on the basis of a permissible maximum speed—as detected, for example, with the aid of a traffic-sign recognition system of the vehicle 10—and on the basis of safety parameters 16 to which the maximum speed 15 is subjected. The safety parameters 16 may in this case correspond to a constant speed deviation and/or to a relative speed deviation. On the basis of the safety parameters 16, it is taken into consideration that many road-users exceed the permissible maximum speed by a constant and/or relative amount.

The control means 8 calculate the state 30 of the vehicle 10 on the basis of the current speed 11 of the vehicle 10 and on the basis of the spacing 5 and the speed 13 of the other vehicle 2 or on the basis of the sensor range 4 and the speed 7 of the virtual vehicle 6. If in this case the state 30 of the vehicle 10 is classified as critical, either a warning device 40 of the vehicle 10 is activated, to warn the driver of the vehicle 10 about a change of lane, or a lane-change assistance system 41 of the vehicle 10 refuses clearance for the change of lane.

Figure 6:
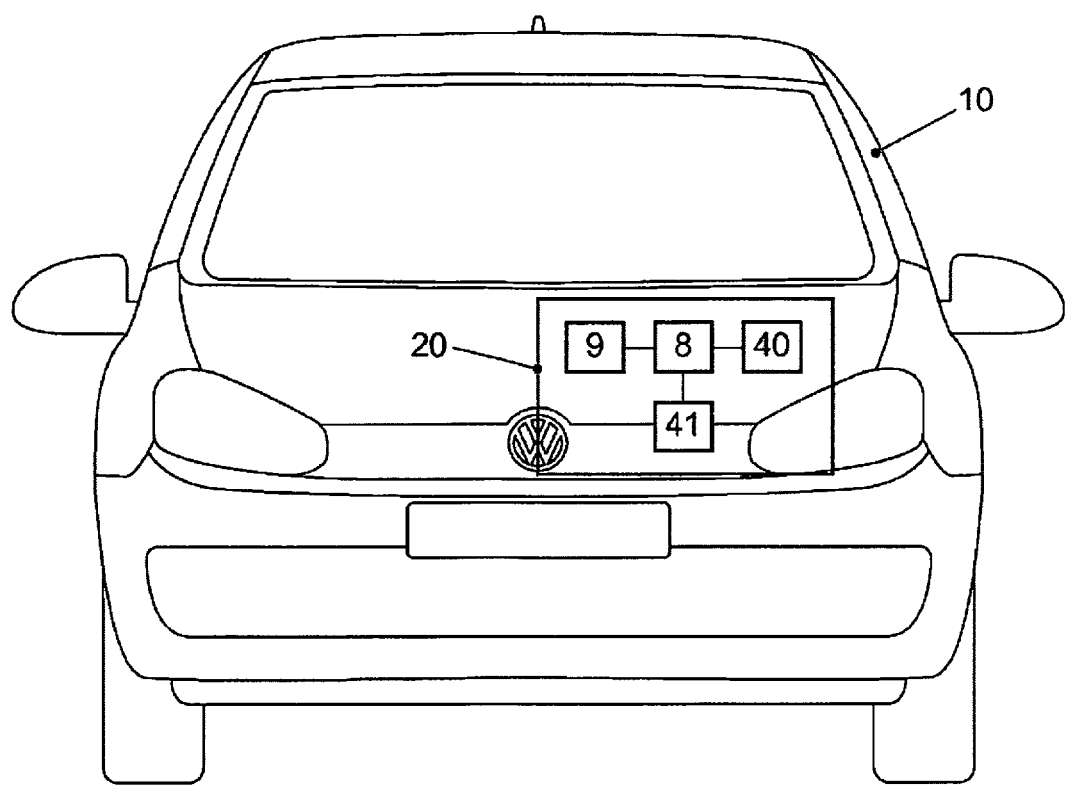
FIG. 6 represents schematically a disclosed vehicle with a disclosed apparatus.

In FIG. 6, a vehicle 10 which includes an apparatus 20 is represented schematically. In this disclosed embodiment, the apparatus 20 comprises a controller 8, a sensor 9 (for example, a radar sensor), a warning device 40 and a lane-change assistance system 41.

LIST OF REFERENCE SYMBOLS 1 lane
2 other vehicle
3 detection zone
4 sensor range
5 spacing
6, 6' virtual vehicle
7 speed of the virtual vehicle
8 control means
9 sensor
10 vehicle
11 speed of the vehicle
12 contour of the detection zone
13 speed of the other vehicle
15 permissible maximum speed
16 safety surcharge
20 apparatus
21 center line
22 point of intersection
30 state
40 warning device
41 lane-change assistance system

The invention claimed is:

1. A method for determining a state of a transportation vehicle being either a critical state or a non-critical state, wherein the transportation vehicle includes a sensor for detecting another transportation vehicle in a vicinity of the transportation vehicle on a roadway, wherein the another transportation vehicle is traveling in the same direction as the transportation vehicle, in an adjacent lane on the right or on the left of the lane in which the transportation vehicle is travelling, the method comprising:
determining a speed of the transportation vehicle; and
determining the vehicle state as critical or non-critical depending on a detection range of the sensor, on the determined speed of the transportation vehicle, and detection of the another vehicle within a speed-dependent minimum spacing in front of or behind the transportation vehicle,
wherein, detection of the another vehicle is based on evaluating-measured values of the sensor to determine a spacing between the transportation vehicle and the another transportation vehicle,
wherein the transportation vehicle is determined to be in the critical state based on the another transportation vehicle being within the minimum spacing in front of or behind the transportation vehicle for an impermissible period of time, and
wherein, the transportation vehicle is determined to be in the critical state based on a position of a virtual vehicle traveling relative to the transportation vehicle in response to no other vehicle being detected within the range of the sensor, wherein the virtual vehicle is positioned at a spacing away from the transportation vehicle that corresponds to the range of the sensor.

2. The method of claim 1,
wherein, in the critical state, a collision with the another transportation vehicle traveling in the same direction as the transportation vehicle in the adjacent lane on the right or on the left or in front of or behind the transportation vehicle is more probable than in the non-critical state.

3. The method of claim 1,
wherein the range of the sensor is determined depending on a detection zone contour of the sensor,
wherein, for this purpose, for each lane of a road being driven along by the transportation vehicle, on which other transportation vehicles are moving in a same direction as the transportation vehicle, a point of intersection in front of the transportation vehicle and a point of intersection behind the transportation vehicle are determined, and
wherein, at each point of intersection, a center line of a corresponding lane and the contour of the sensor detection zone intersect, whereby the range of the sensor for each lane is determined as the spacing between the transportation vehicle and the respective point of intersection for that respective lane.

4. The method of claim 1, wherein the state of the transportation vehicle is also determined based on a minimum permissible speed of the roadway on which the transportation vehicle is travelling.

5. The method of claim 1, wherein the state of the transportation vehicle is also determined based on a permissible maximum speed of the roadway on which the transportation vehicle is travelling.

6. The method of claim 5, further comprising:
assuming the virtual vehicle is traveling at the permissible maximum speed along along the roadway and is located behind the transportation vehicle at a spacing that corresponds to the range of the sensor; and
determining based on the permissible maximum speed, the speed of the transportation vehicle, an assumed reaction-time of a driver of the virtual vehicle, an assumed negative acceleration of the virtual vehicle after the assumed reaction-time, and on the range of the sensor, whether the virtual vehicle will be within the speed-dependent minimum spacing from the transportation vehicle.

7. The method of claim 1, further comprising detecting the another transportation vehicle, a spacing between the transportation vehicle and the another transportation vehicle and a speed of the another transportation vehicle by the sensor, wherein the determination of the state of the transportation vehicle based on the speed of the transportation vehicle, on the speed of the another transportation vehicle, and on the spacing between the transportation vehicle and the another transportation vehicle.

8. An apparatus for determining a state of a transportation vehicle being either a critical state or a non-critical state, wherein the transportation vehicle includes a sensor for detecting another transportation vehicle in a vicinity of the transportation vehicle on a roadway, wherein the another transportation vehicle is traveling in the same direction as the transportation vehicle, in an adjacent lane on the right or on the left of the lane in which the transportation vehicle is travelling, the apparatus comprising:

a sensor for measuring values;

a means for detecting another transportation vehicle; and a controller, wherein the controller determines a speed of the transportation vehicle and determines the vehicle state as critical or non-critical depending on a detection range of the sensor, on the determined speed of the transportation vehicle, and detection of the another vehicle within a speed-dependent minimum spacing in front of or behind the transportation vehicle, wherein, detection of the another vehicle is based on evaluating-measured values of the sensor to determine a spacing between the transportation vehicle and the another transportation vehicle, wherein the transportation vehicle is determined to be in the critical state based on the another transportation vehicle being within the minimum in front of or behind the transportation vehicle for an impermissible period of time, and wherein, the transportation vehicle is determined to be in the critical state based on a position of a virtual vehicle traveling relative to the transportation vehicle in response to no other vehicle being detected within the range of the sensor, wherein the virtual vehicle is positioned at a spacing away from the transportation vehicle that corresponds to the range of the sensor.

9. The apparatus of claim 8, wherein, in the critical state, a collision with the another transportation vehicle traveling in the same direction as the transportation vehicle in the adjacent lane on the right or on the left or in front of or behind the transportation vehicle is more probable than in the non-critical state.

10. A transportation vehicle with an apparatus as claimed in claim 8.

11. The apparatus of claim 8, wherein the range of the sensor is determined depending on a detection zone contour of the sensor, wherein, for this purpose, for each lane of a road being driven along by the transportation vehicle, on which other transportation vehicles are moving in a same direction as the transportation vehicle, a point of intersection in front of the transportation vehicle and a point of intersection behind the transportation vehicle are determined, and wherein, at each point of intersection, a center line of a corresponding lane and the contour of the sensor detection zone intersect, whereby the range of the sensor for each lane is determined as the spacing between the transportation vehicle and the respective point of intersection for that respective lane.

12. The apparatus of claim 8, wherein the state of the transportation vehicle is also determined based on a minimum permissible speed of the roadway on which the transportation vehicle is travelling.

13. The apparatus of claim 8, wherein the state of the transportation vehicle is also determined based on a permissible maximum speed of the roadway on which the transportation vehicle is travelling.

14. The apparatus of claim 8, wherein the virtual vehicle is assumed to be traveling at the permissible maximum speed along the roadway and is located behind the transportation vehicle at a spacing that corresponds to the range of the sensor, and wherein a determination is made whether the virtual vehicle will be within the speed-dependent minimum spacing from the transportation vehicle based on the permissible maximum speed, the speed of the transportation vehicle, an assumed reaction-time of a driver of the virtual vehicle, an assumed negative acceleration of the virtual vehicle after the assumed reaction-time, and on the range of the sensor.

15. The apparatus of claim 8, further comprising detecting the another transportation vehicle, a spacing between the transportation vehicle and the another transportation vehicle and a speed of the another transportation vehicle by the sensor, wherein the determination of the state of the transportation vehicle based on the speed of the transportation vehicle, on the speed of the another transportation vehicle, and on the spacing between the transportation vehicle and the another transportation vehicle.

\* \* \* \* \*